T. ALTENEDER.
Compass Joint.
No. 111,715.
Patented Feb. 14, 1871.
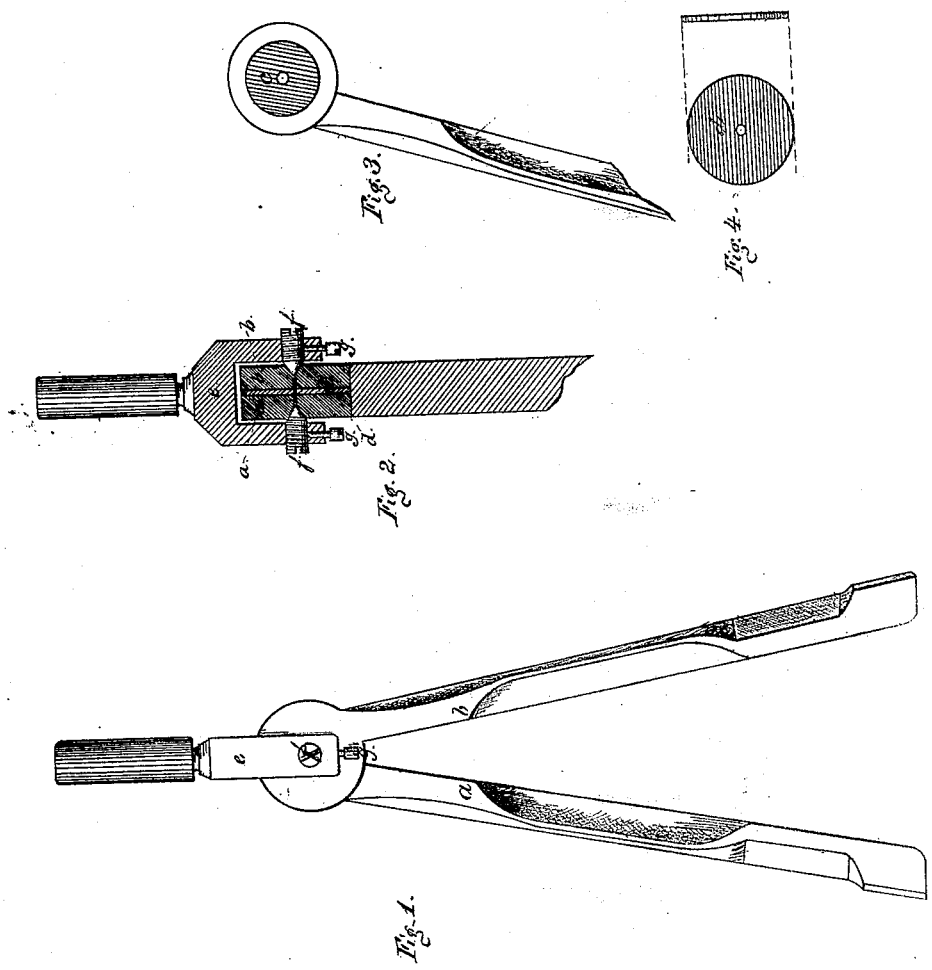

United States Patent Office.

THEODORE ALTENEDER, OF PHILADELPHIA, PENNSYLVANIA.

Letters Patent No. 111,715, dated February 14, 1871.

IMPROVEMENT IN COMPASS-JOINTS.

The Schedule referred to in these Letters Patent and making part of the same.

I, THEODORE ALTENEDER, of Philadelphia, in the State of Pennsylvania, have invented certain Improvements in Compass-Joints, of which the following is a specification.

Description of the Accompanying Drawing.

Figure 1 is a plan view of my invention.
Figure 2 is a side view, in transverse section.
Figure 3 is one of the heads of the halves of the device, and is designed to show the recess provided therein.
Figure 4 is a plan and side view of the horn or bone washer.

My invention relates to an improvement in compass-joints, the parts of which are so constructed and combined as to not only exclude dust and dirt, but also to prevent wear and friction, and the consequent inefficiency which proceeds therefrom.

It consists in the peculiar construction of the halves of the device, which are circular at the joints thereof, and also, in the location between said joints, of a horn, bone, or other equivalent washer, for absorbing oil for lubricating the parts and rendering the friction uniform, and in a recess located in the interior face of said joints, or in one of them, for retaining oil, for the purpose as aforesaid.

The heads of the halves $a$ and $b$ are nearly circular, and about half as thick as the lower part thereof and they are formed to fit with their flat sides together.

By this construction of the joints concave shoulders are provided, which accurately fit the adjoining circular-heads, as shown in fig. 3, and thus prevent the dust from collecting at that point.

In the interior face of one or both of the said circular heads a slight recess, $c$, is provided for the retention of oil, which recess, together with the washer $d$, which latter is constructed of horn, bone, or other equivalent material, and located between the flat sides of the head, furnish a constant lubricant.

The washer $d$ is constructed of horn or bone, because they absorb oil, and, as the air and dust are excluded, the oil needs but seldom, if ever, to be replenished, while the friction is thus rendered uniform and almost imperceptible, unless the flat circular joints are very tightly pressed together by the center-screws.

The cap-piece, $e$, is fitted on the outside of the pieces $a$ and $b$, and is screwed to the latter by the center-screws $f$, which are provided with conical ends, which penetrate through the sides of the cap-piece $f$, and into concave apertures provided in the outside of the pieces $a$ and $b$, which thus work between centers. The flat circular joints can thus be pressed together very tightly, and the amount of friction nicely adjusted to any reqired degree.

The center-screws $f$ are prevented from becoming loose by the set-screws $g$.

Claim.

The halves $a$ and $b$ of a compass-joint, provided with recess $c$ and washer $d$, and the combination and arrangement thereof, substantially as and for the purpose shown and described.

THEODORE ALTENEDER.

Witnesses:
H. A. DANIELS,
G. B. TOWLES.